United States Patent
Flacher et al.

(10) Patent No.: US 9,838,409 B2
(45) Date of Patent: Dec. 5, 2017

(54) COLD START MECHANISM TO PREVENT COMPROMISE OF AUTOMATIC ANOMALY DETECTION SYSTEMS

(71) Applicant: Cisco Technology, Inc., San Jose, CA (US)

(72) Inventors: Fabien Flacher, Antony (FR); Grégory Mermoud, Veyras (CH); Jean-Philippe Vasseur, Anchorage, AK (US); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 14/878,145

(22) Filed: Oct. 8, 2015

(65) Prior Publication Data

US 2017/0104773 A1    Apr. 13, 2017

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |
| H04L 29/06 | (2006.01) | |

(52) U.S. Cl.
CPC ...... *H04L 63/1425* (2013.01); *H04L 63/1458* (2013.01)

(58) Field of Classification Search
CPC .................................................. H04L 63/1425
USPC ........................................................ 726/23
See application file for complete search history.

(56) References Cited

U.S. PATENT DOCUMENTS

| | | | |
|---|---|---|---|
| 7,739,211 B2 | 6/2010 | Coffman et al. | |
| 8,544,087 B1 | 9/2013 | Eskin et al. | |
| 9,361,463 B2* | 6/2016 | Ferragut | G06F 21/577 |
| 9,497,204 B2* | 11/2016 | Symons | G06N 5/043 |
| 2006/0034305 A1 | 2/2006 | Heimerdinger et al. | |
| 2007/0063548 A1* | 3/2007 | Eipper | G06K 9/6284 296/203.01 |
| 2010/0153316 A1* | 6/2010 | Duffield | G06F 21/552 706/12 |
| 2015/0058982 A1* | 2/2015 | Eskin | G06F 17/30914 726/23 |
| 2015/0193696 A1 | 7/2015 | Vasseur et al. | |
| 2015/0269050 A1* | 9/2015 | Filimonov | G06F 11/3409 702/183 |
| 2015/0304349 A1* | 10/2015 | Bernstein | H04L 63/1425 726/22 |

(Continued)

OTHER PUBLICATIONS

Li Han; "Research of K-MEANS Algorithm Based on Information Entropy in Anomaly Detection", Year: 2012, IEEE Conference Publications, pp. 71-74, DOI: 10.1109/MINES.2012.169.*

(Continued)

*Primary Examiner* — Morshed Mehedi
*Assistant Examiner* — Khalil Naghdali
(74) *Attorney, Agent, or Firm* — Parker Ibrahim & Berg LLC; James M. Behmke; Stephen D. LeBarron

(57) ABSTRACT

In one embodiment, a device in a network analyzes data indicative of a behavior of a network using a supervised anomaly detection model. The device determines whether the supervised anomaly detection model detected an anomaly in the network from the analyzed data. The device trains an unsupervised anomaly detection model, based on a determination that no anomalies were detected by the supervised anomaly detection model.

18 Claims, 11 Drawing Sheets

(56) References Cited

U.S. PATENT DOCUMENTS

2016/0253598 A1* 9/2016 Yamada ................ G06F 21/00
                                                               706/12
2016/0285700 A1* 9/2016 Gopalakrishnan ....... G06N 5/04
2017/0061322 A1* 3/2017 Chari ................... G06N 99/005

OTHER PUBLICATIONS

Singh, et al., "A Survey on Machine Learning Techniques for Intrusion Detection Systems", International Journal of Advanced Research in Computer and Communication Engineering, vol. 2, Issue 11, Nov. 2013, pp. 4349-4355.

* cited by examiner

COLD START MECHANISM TO PREVENT COMPROMISE OF AUTOMATIC ANOMALY DETECTION SYSTEMS

TECHNICAL FIELD

The present disclosure relates generally to computer networks, and, more particularly, to a cold start mechanism to prevent compromise of automatic anomaly detection systems.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it is more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
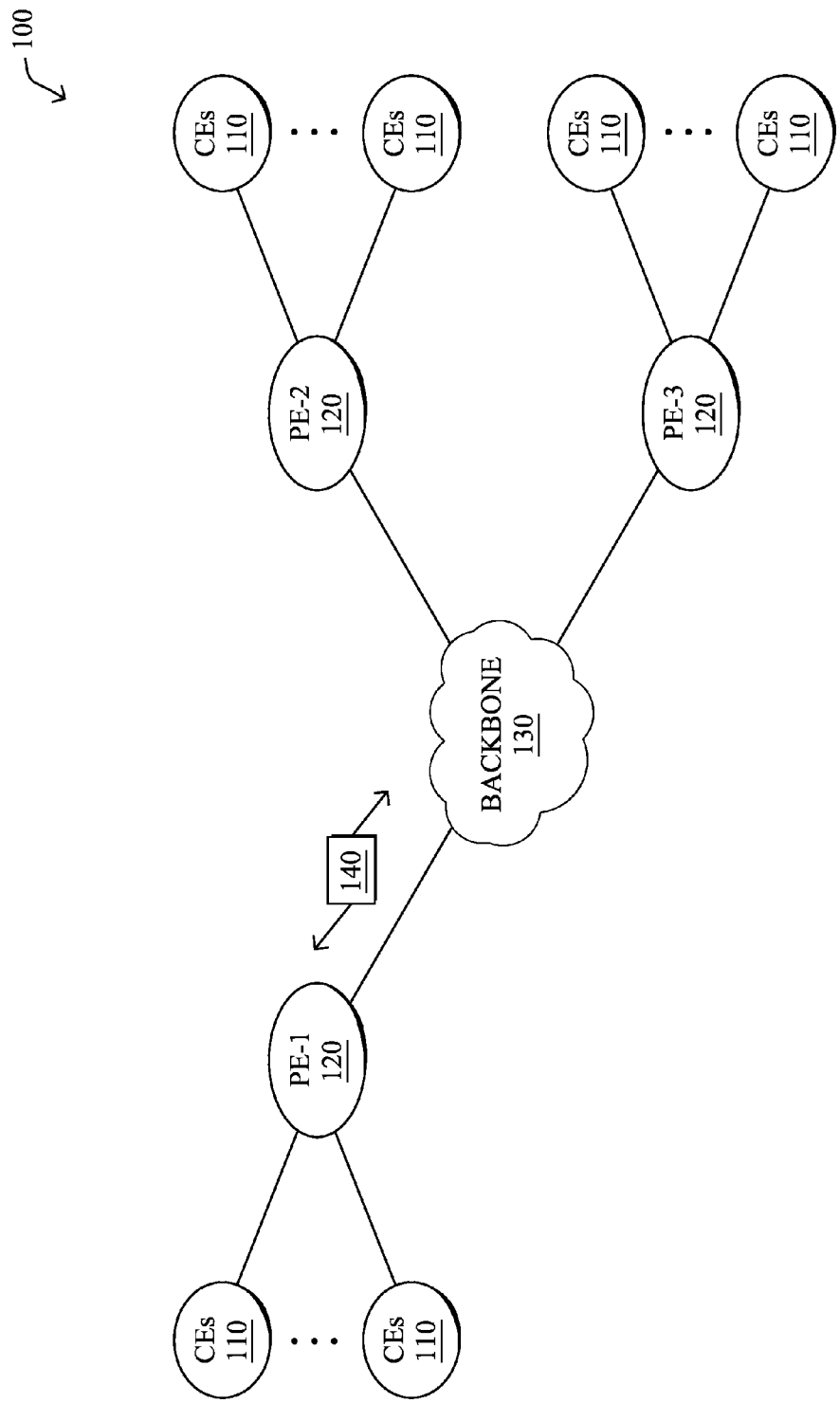
FIGS. 1A-1B illustrate an example communication network.

According to one or more embodiments of the disclosure, a device in a network analyzes data indicative of a behavior of a network using a supervised anomaly detection model. The device determines whether the supervised anomaly detection model detected an anomaly in the network from the analyzed data. The device trains an unsupervised anomaly detection model, based on a determination that no anomalies were detected by the supervised anomaly detection model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes is interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
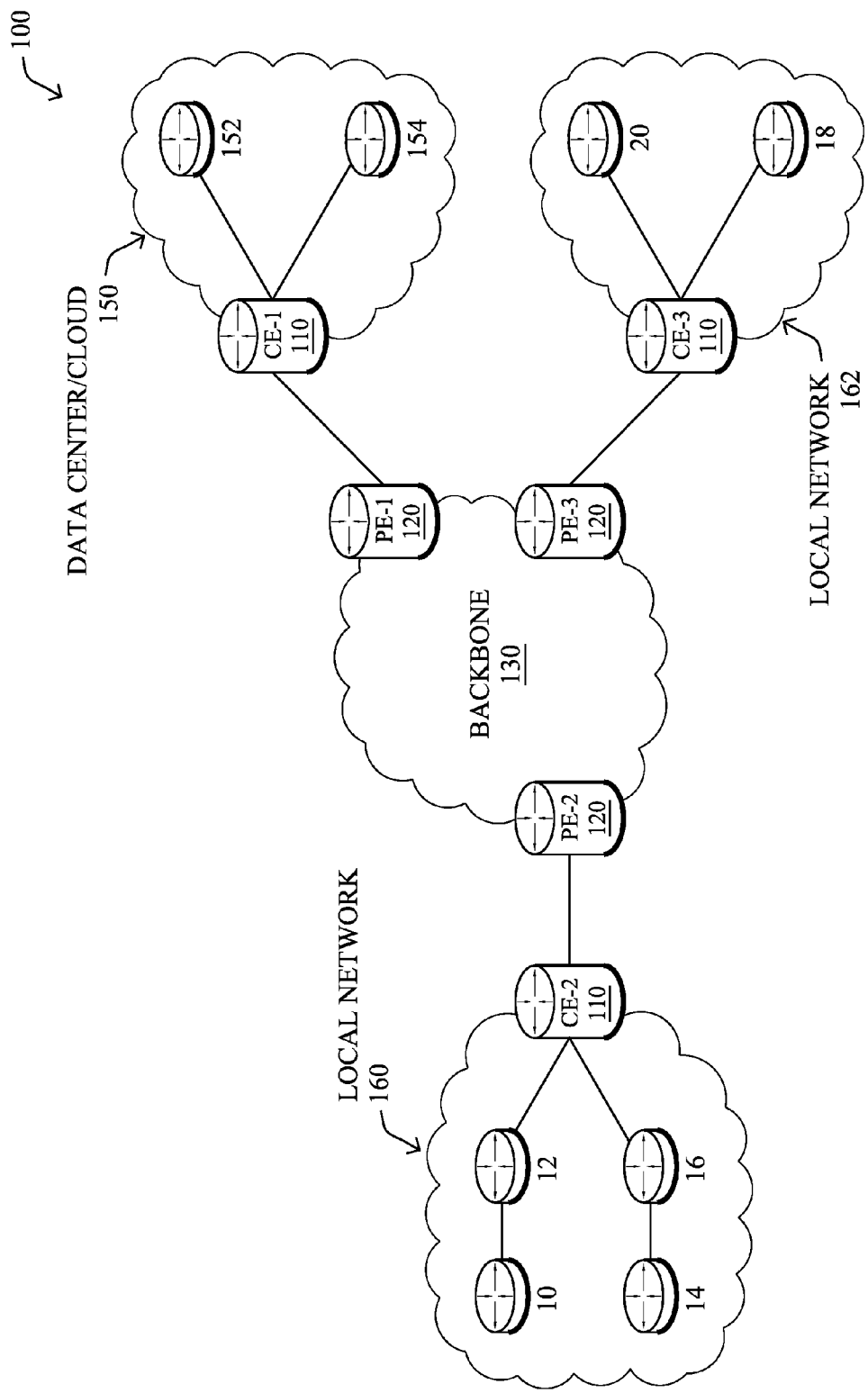

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal is changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
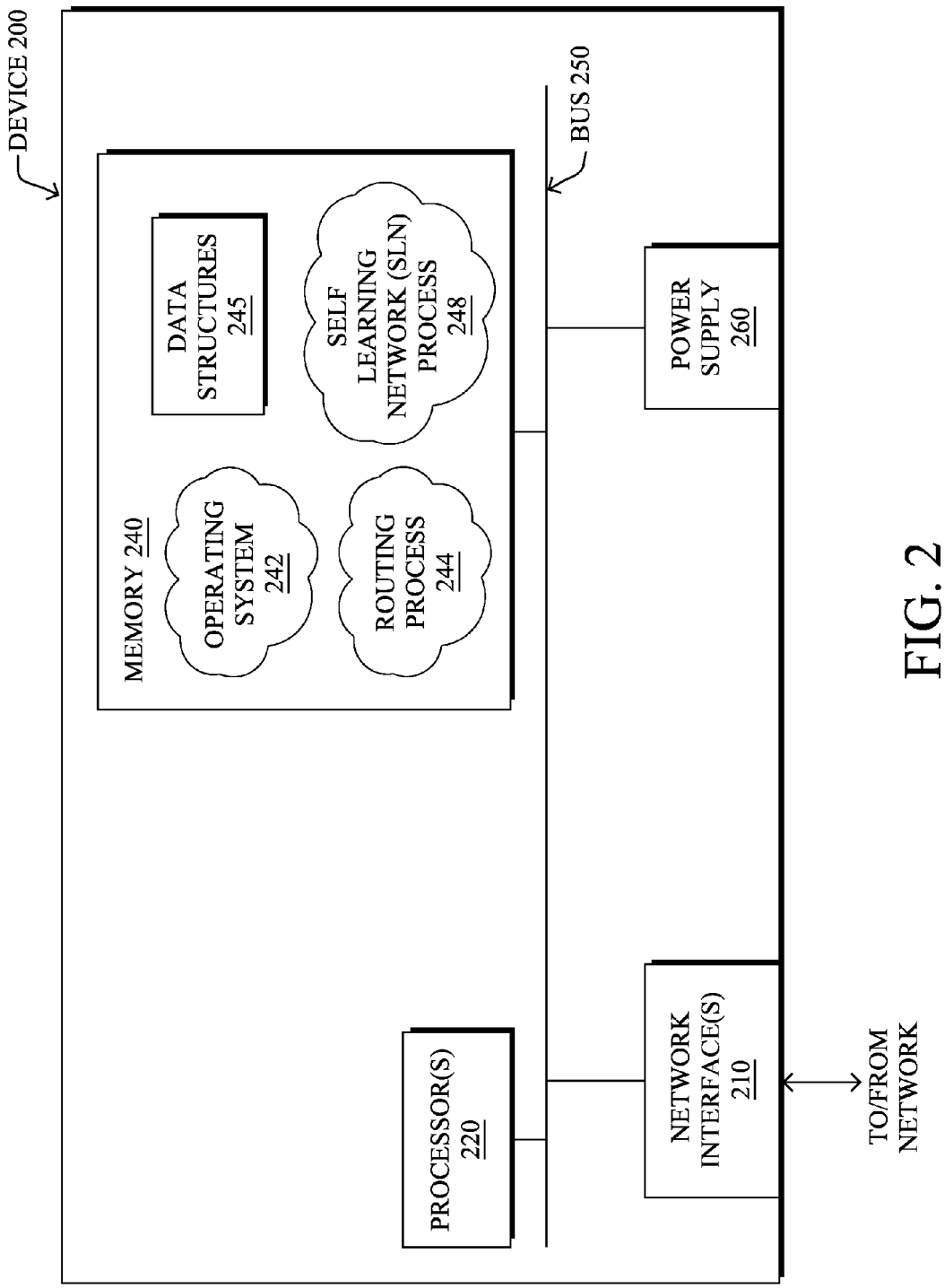
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), is portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based is Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.)

contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic black-hole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes is interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
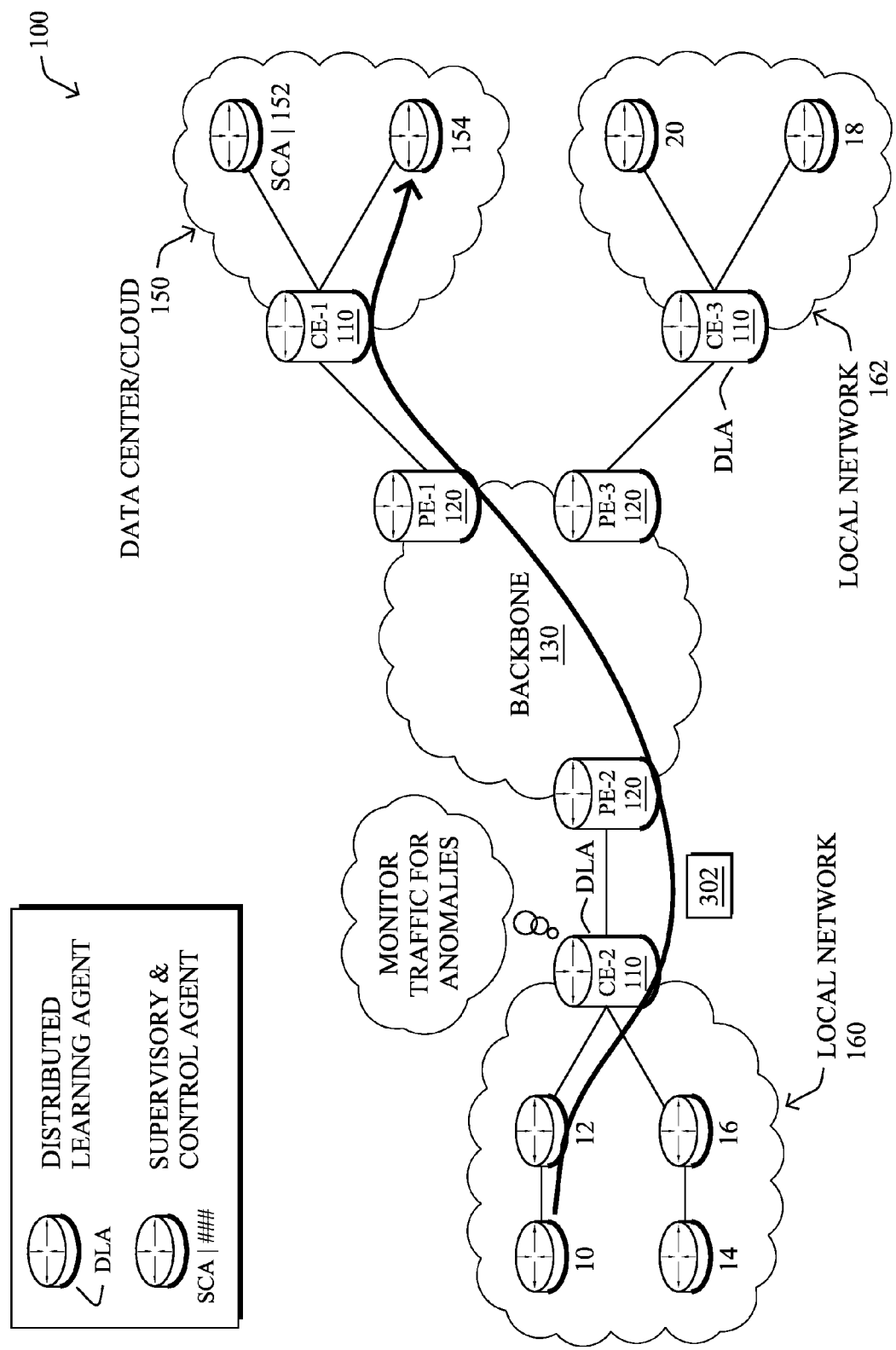
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Anomalies such as DoS attacks are relatively easy to detect when they are brute-force (e.g. volumetric) but, especially when highly distributed, they may be difficult to distinguish from a flash-crowd (e.g., an overload of the system due to many legitimate users accessing the system at the same time). This fact, in conjunction with the increasing complexity of performed attacks, makes the use of "classic" (usually is threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication is applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, various machine learning techniques may be used to analyze the operations of a computer network. Such techniques may be separated into two different categories: 1.) supervised learning and 2.) unsupervised learning. Generally, training a supervised learning model involves the use of a set of labels applied as a ground truth to an input set of training data. For example, a human or machine expert may label/classify certain network conditions, to train the model to label future network conditions as well. Typically, supervised learning is used for purposes of fault or fraud detection, diagnostics, or the like. Unsupervised learning, in contrast, does not require any prior knowledge of the system and is well suited for purposes such as identifying similar classes.

In LLNs and other networks that are typically large, complex, and highly dynamic (e.g., changing frequently, etc.), building and maintaining information regarding the network (e.g., topology, behaviors rules, etc.) is very expensive and generally not doable. Thus, unsupervised machine learning presents an attractive option since the anomaly detection system does not need any prior knowledge of the network to detect anomalies. Such a mechanism may use real data (e.g., data regarding network traffic flows, etc.) and is attempt to extract regular behavior patterns from this data, to construct a model of the network dynamics.

While unsupervised anomaly detection has certain advantages over supervised mechanisms, deployment of an unsupervised anomaly detector still remains challenging. Notably, when the system has to start fresh and be deployed on a new or otherwise unknown network, there is no prior model of the network and one will need to be constructed by the unsupervised attack detector. However, assume that the network has already been corrupted, prior to training the unsupervised model (e.g., several hosts are compromised, are misbehaving, etc.). In such a case, the unsupervised model will be trained to incorporate the anomalies as normal behavior, leading to an incorrect model of normal traffic and network behavior. In other words, the anomalous behavior may be integrated into the "normal" baseline of the unsupervised model, preventing the model from detecting these types of anomalies, even though the model may still be able to detect anomalies that occur subsequently. Said differently, the deployment of an unsupervised anomaly detection mechanism in a network may result in the mechanism being blind to any network anomalies that were preexisting during the training phase of the anomaly detection model.

While classic malware detection mechanisms may be able to detect certain anomalies, such as the signatures of certain viruses, these mechanisms may not be able to detect preexisting anomalies that use more subtle approaches (e.g., data exfiltration, stealth scans, certain forms of DoS attacks, etc.). Manual verification of normal/abnormal network behavior by a network administrator may also be impractical, particularly in LLNs and other large-scale networks that include a large number of routers (e.g., hundreds, thousands, etc.). Thus, the only viable option to deploying an unsupervised anomaly detector is to find an approach capable of identifying whether the network is compromised prior to the detector conducting any dynamic learning.

Cold Start Mechanism to Prevent Compromise of Automatic Anomaly Detection Systems The techniques herein provide for the use of supervised machine learning, prior is to, or in conjunction with, the training of an unsupervised anomaly detection mechanism in a network. In some aspects, the supervised machine learning model may be used to validate that the network has not already been compromised, so that the unsupervised anomaly detection mechanism can be trained appropriately using the specific dynamics of the network. Notably, supervised learning mechanisms may be used to quantify the behavior of the network, prior to deployment of an unsupervised-based SLN system. In some aspects, the supervised mechanism may take into account user feedback regarding any false positives (e.g., from a network administrator), allowing for the supervised anomaly detector to be retrained as needed (e.g., potentially using multiple offline supervised anomaly detectors and the traffic profile in the network). In another aspect, a feedback mechanism is also introduced herein that allows user knowledge to be integrated seamlessly into the training workflow for the unsupervised anomaly detector.

Specifically, according to one or more embodiments of the disclosure as described in detail below, a device in a network analyzes data indicative of a behavior of a network using a supervised anomaly detection model. The device determines whether the supervised anomaly detection model detected an anomaly in the network from the analyzed data. The device trains an unsupervised anomaly detection model, based on a determination that no anomalies were detected by the supervised anomaly detection model.

Illustratively, the techniques described herein may be performed by hardware, software, and/or firmware, such as in accordance with the SLN process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various PLC protocols or wireless communication protocols, and as such, may be processed by similar components understood in the art that execute those protocols, accordingly.

Operationally, a first aspect of the techniques herein relies on the use of one or is more supervised learning machines that are able to detect specific stealth or distributed attacks. Such mechanisms may be based on ANNs, decision trees, or any other form of supervised machine learning operable to detect network anomalies. In some aspects, the supervised learning mechanism may be trained offline using behavior information from one or more other networks and/or anomaly types. In doing so, the supervised anomaly detector may have a certain degree of generality to it and be able to detect anomalies across a wide range of different networks.

Referring now to FIGS. 4A-4D, examples are shown of a DLA in a network detecting an anomaly using a supervised anomaly detection model. Such a supervised model may be deployed to any number of DLAs in the network for which an unsupervised anomaly detector is to be trained. For example, a supervised anomaly detection model may be deployed to a DLA 402 (e.g., by SCA 404 or another control device in the network). As would be appreciated, if the supervised model deployed to DLA 402 is configured with a certain degree of generality across different networks, the deployed model also does not require prior knowledge of the network in which DLA 402 is located.

Figure 4A:
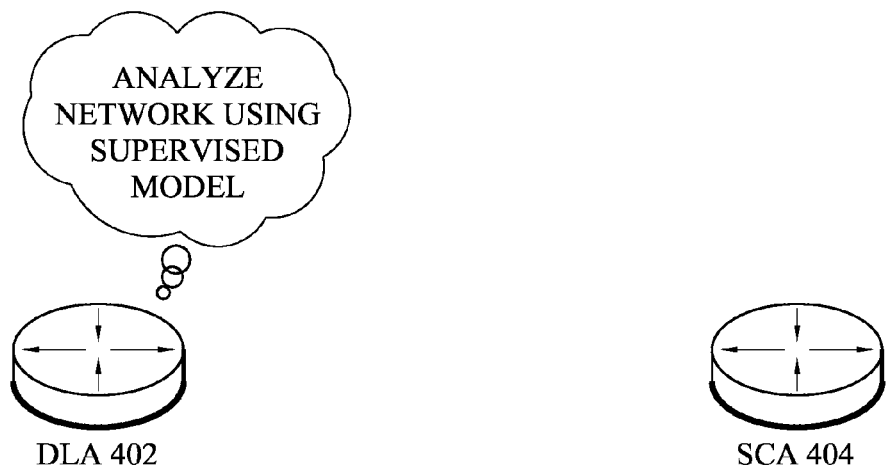
FIGS. 4A-4D illustrate examples of a distributed learning agent (DLA) detecting an anomaly using a supervised anomaly detection model.
Figure 4B:
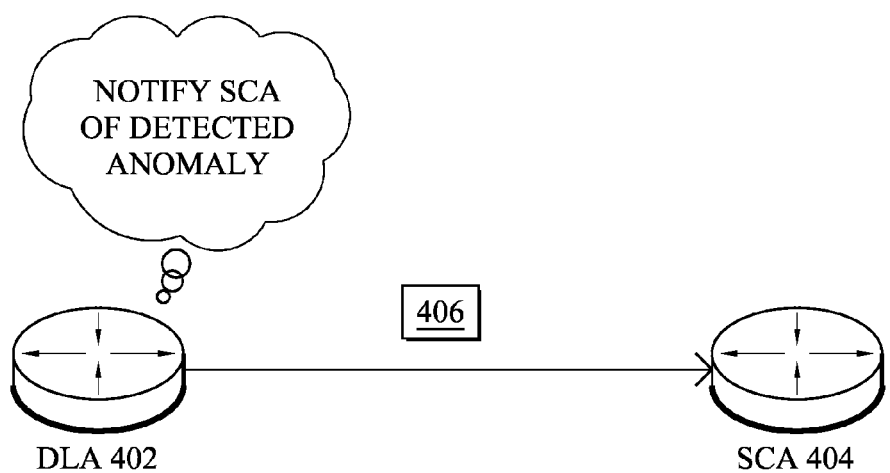

When deployed, the supervised anomaly detector may be activated alone by DLA 402, to identify any existing anomalies in the network. If the DLA then detects an anomaly using the supervised model (e.g., a pattern typical of a malicious behavior learned offline by the model), the DLA may send an indication of the detected anomaly to the SCA or another supervisory device. For example, as shown in FIG. 4B, DLA 402 may send an alert 406 to SCA 404, to indicate that an anomaly was detected using the supervised learning model. In some embodiments, alert 406 may be a custom IPv4 or IPv6 message called Superv_Alarm( ) that includes information regarding the detected anomaly. For example, alert 406 may include a label for the identified malicious or otherwise anomalous behavior, contextual information regarding the detected anomaly (e.g., traffic records that triggered the anomaly detection), or any other information regarding the detected anomaly.

Figure 4C:
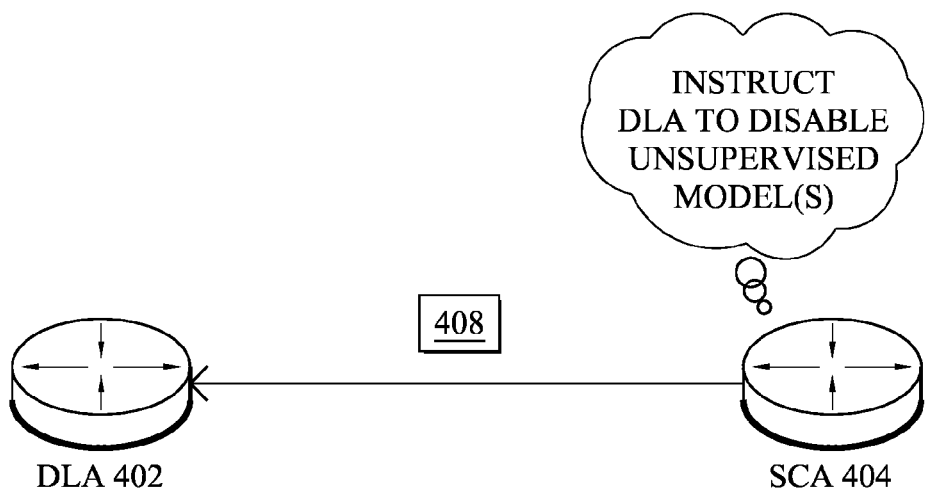

In response to receiving an indication of a detected anomaly by the supervised anomaly detector, the SCA may instruct the DLA to preempt the training or use of any unsupervised anomaly detection mechanisms (e.g., until notified otherwise, for a certain amount of time, etc.). For example, as shown in FIG. 4C, SCA 404 may send a message 408 back to DLA 402 that instructs DLA 402 to disable any of its unsupervised anomaly detection models until further notice. In one embodiment, message 408 may be a custom IPv4 or IPv6 message called Interupt_Training( )that causes DLA 402 to disable the training and/or use of any of its unsupervised anomaly detection mechanisms.

Figure 4D:
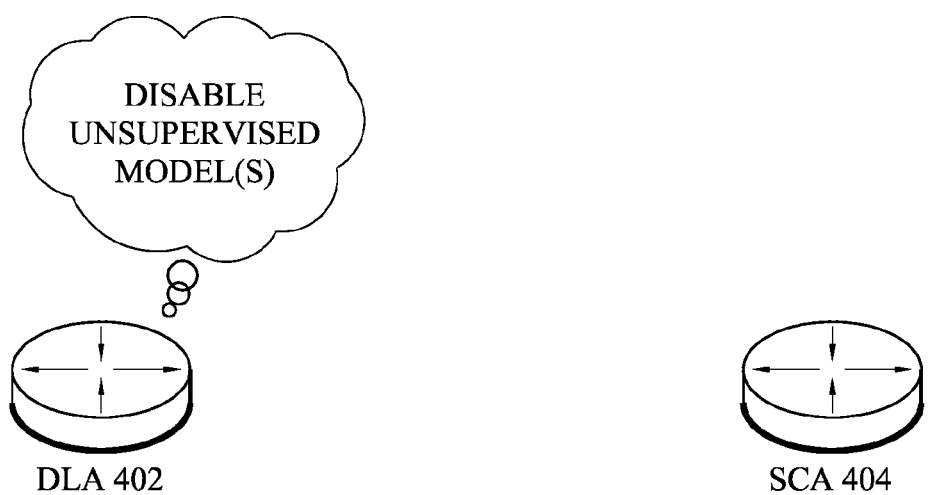

As shown in FIG. 4D, DLA 402 may disable its unsupervised anomaly detection mechanism, should its supervised anomaly detection mechanism detect an anomaly. In one embodiment, DLA 402 may disable its unsupervised model(s) in response to receiving an instruction to do so from SCA 404 (e.g., message 408). In other embodiments, DLA 402 may make the decision to suspend its unsupervised model(s) locally. For example, if DLA 402 determines that the confidence of the supervised model exceeds a defined threshold, DLA 402 may suspend use of its unsupervised model without first receiving an instruction to do so from SCA 404.

Referring now to FIGS. 5A-5D, examples are shown of an SLA confirming a detected anomaly. According to various embodiments, a feedback mechanism may be used to take into account certain user feedback, should the DLA detect an anomaly using the supervised anomaly detection model. In particular, there are two possible scenarios when an anomaly is detected by the supervised machine learning model: 1.) the anomaly is a true positive or 2.) the anomaly is a false positive.

Figure 5A:
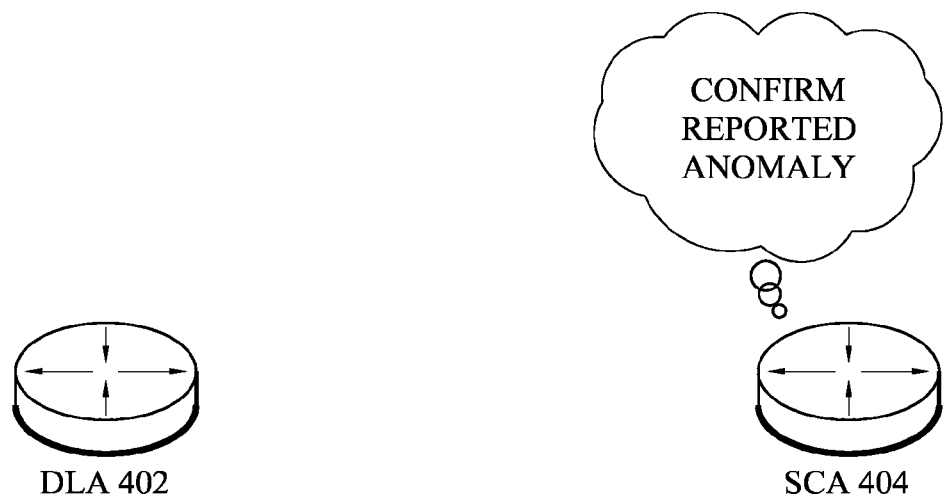
FIGS. 5A-5D illustrate examples of an SLN centralized agent (SLA) confirming a detected anomaly.

As shown in FIG. 5A, SCA 404 may be operable to confirm any anomalies reported by DLA 402 and detected using the supervised machine learning model. In some embodiments, SCA 404 may confirm a reported anomaly by providing information regarding the anomaly to a user interface (e.g., via an electronic display), thereby allowing a network administrator to confirm whether the detected anomaly is a true positive or is a false positive. In other embodiments, SCA 404 may use automated means to confirm the reported anomaly (e.g., by analyzing the contextual data regarding the anomaly, etc.).

Figure 5B:
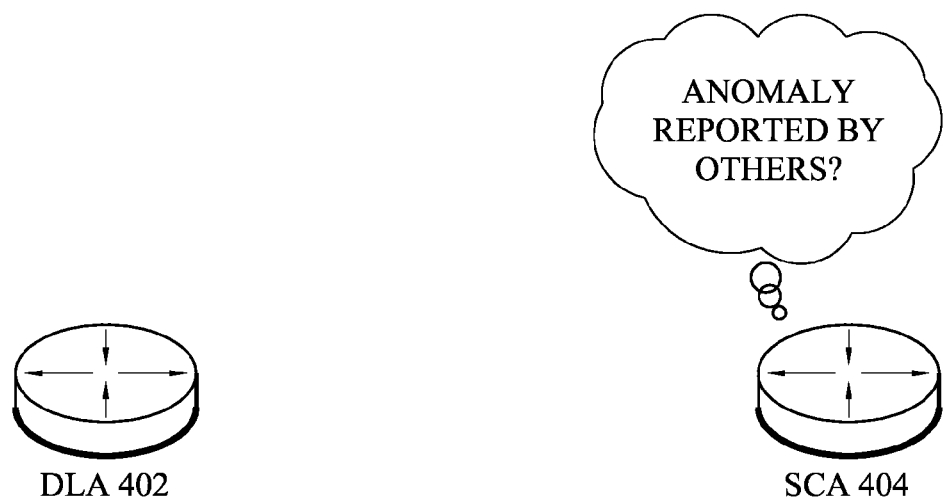

In one embodiment, if the SCA determines that a reported anomaly is a false positive, the SCA may determine whether the anomaly was also reported by other DLAs. For example, as shown in FIG. 5B, SCA 404 may start a configurable timer in response to determining that DLA 402 has reported a false positive. On expiration of the timer, SCA 404 may determine whether corresponding false positives were raised by other DLAs during the time period of the timer.

If the SCA determines that one or more DLAs reported a false positive, the SCA may determine whether the supervised model should be retrained (e.g., to prevent or limit further false positives from being reported). In one embodiment, the SCA may base this decision on the number of other DLAs that also reported the false positive within a certain amount of time. For example, if SCA 404 determines that only a few DLAs in the network reported a particular false positive, SCA 404 may determine that the supervised anomaly detection model does not require further offline training. Put simply, the SCA may assess the generality of the unsupervised model by analyzing the occurrence of false positives after deployment of the unsupervised model.

Figure 5C:
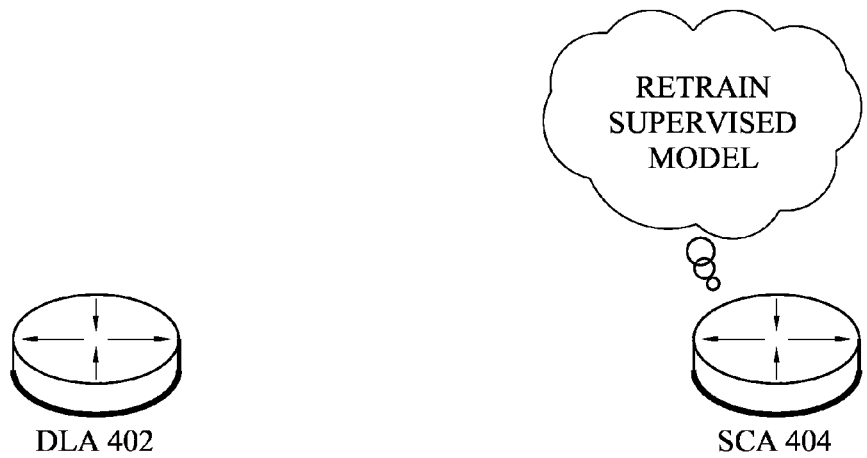

In various embodiments, if the SCA determines that the supervised anomaly detection model requires retraining (e.g., due to reported false positives by the DLAs), the SCA may retrain the supervised model using offline data. For example, as shown in FIG. 5C, SCA 404 may retrain the supervised model using network behavior data (e.g., traffic records, etc.), such as those reported with a detected anomaly (e.g., as part of a Superv_Alarm( )message sent by DLA 402, etc.). In some cases, this can be achieved using incremental learning techniques. For example, in the case of an ANN, the supervised model may be updated by performing a limited number of steps of back-propagation using the records.

Figure 5D:
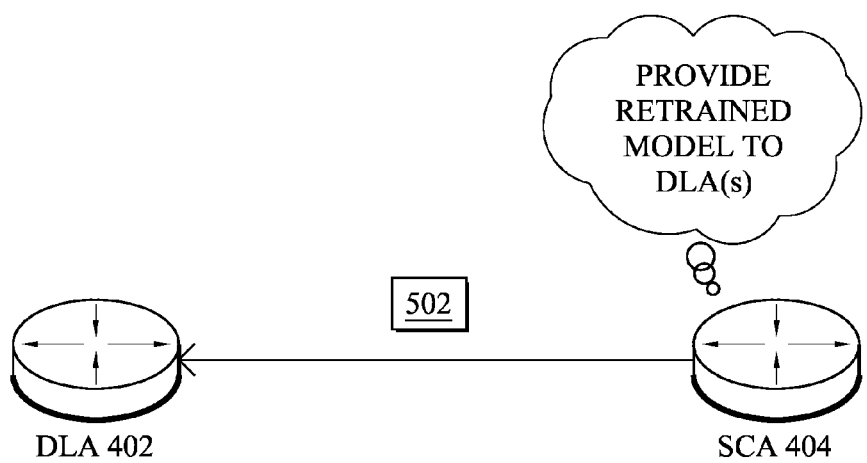

Once the supervised anomaly detection mechanism has been retrained, the SCA may propagate the updated model to the any or all of the DLAs. For example, as shown in FIG. 5D, SCA 404 may provide the retrained model(s) to DLA 402 via a message 502. In doing so, the unsupervised model may be adapted for the specific behavior that caused the false positive, allowing the model to be reused to validate the current network behavior one and for all.

In some embodiments, the SCA may assess, based on the type of traffic data involved in the false positive, if a new version of the supervised model should be deployed to other DLAs, in addition to the DLA that first reported the false positive. In particular, if the traffic patterns observed by the DLAs are sufficiently heterogeneous, a single pre-trained detector might not be enough and the system might need to "specialized" detectors for groups of DLAs. This can be achieved by clustering the records that come from the various DLAs, e.g., via Superv_Alarm( )messages. A cluster analysis of these records can determine the optimal k-number of clusters. Then, the SCA may generate up to k-number of distinct supervised detectors based on the records from these clusters, thereby specializing each detector for specific network conditions encountered by the various DLAs. In turn, the SCA may assign to each DLA the detector that matches the most records that the DLA previously reported to the SCA.

As shown in FIG. 5D, message 502 may be a custom IPv4 or IPv6 message called Off_Line_Detector_Update( ) and include the updated/retrained, unsupervised model(s). SCA 404 may send message 502 as a unicast message to one or more DLAs or to a group of DLAs as a multicast message, in various embodiments. In response to receiving message 502, the DLA may install the updated model and restart its supervised anomaly detector.

Referring now to FIGS. 6A-6D, examples are shown of a library of lawful anomalies being used. According to various embodiments, a library of supervised detectors may be trained to identify atypical, yet lawful, network behaviors (e.g., scanning for printers, communicating with software update servers, application rollout, etc.), instead of malicious behaviors. For example, as shown in FIG. 5A, SCA 404 or another device may provide a library of lawful behaviors to DLA 402 via a message 602.

Figure 6A:
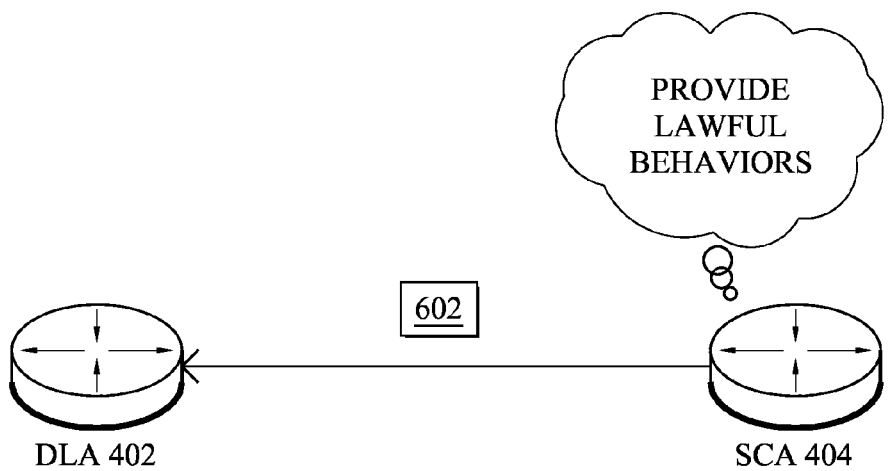
FIGS. 6A-6D illustrate examples of a library of lawful anomalies being used.
Figure 6B:
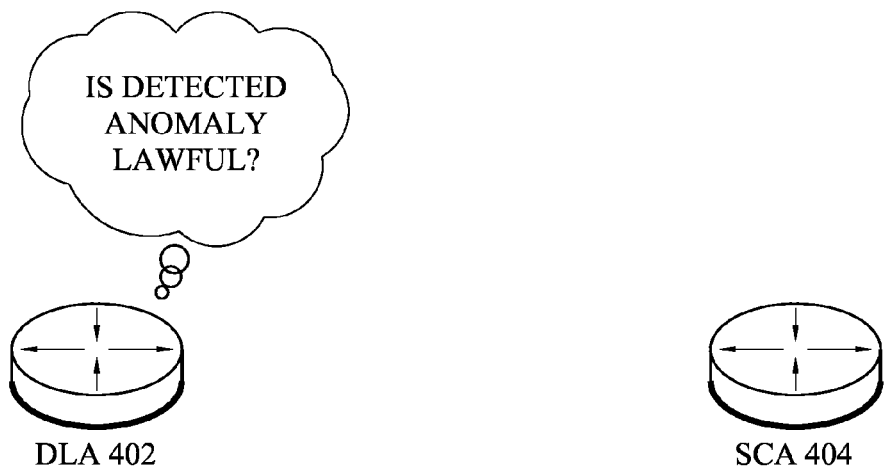
Figure 6C:
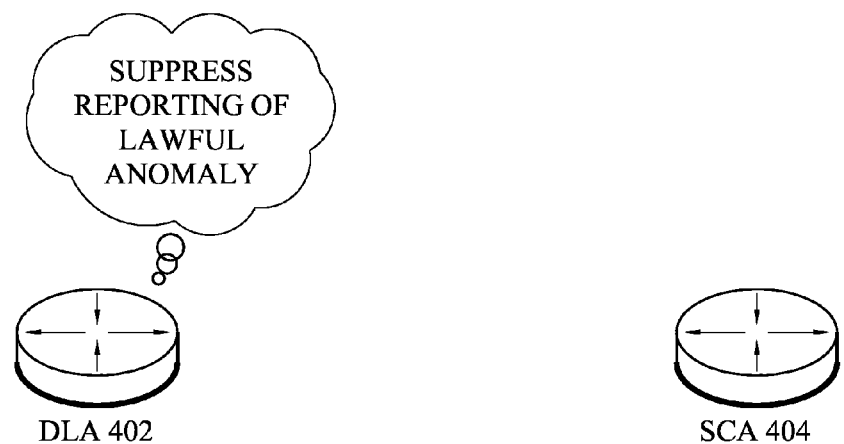

In some embodiments, if an anomaly detection mechanism identifies an anomalous behavior, but one of the detectors in the library of lawful behaviors recognizes the behavior, the DLA may suppress the event. For example, as shown in FIG. 6B, DLA 402 may determine whether an anomaly detected by its supervised anomaly detection model is lawful according to the library received from SCA 404. If so, as shown in FIG. 6C, DLA 402 may suppress the detection event. In one embodiment, the event may also be fed again into the model with the corresponding input data (possibly with a higher learning rate), to make the anomaly more recognizable.

In some cases, a network administrator may enable/disable some of the detectors of the provided library based on the administrator's knowledge of the network. For example, if the administrator knows that software updates will not be performed, the administrator may disable the corresponding detector(s) in the library sent to the DLA. Conversely, the administrator may enable a particular detector only in specific circumstances (e.g., upon an application rollout, etc.).

Figure 6D:
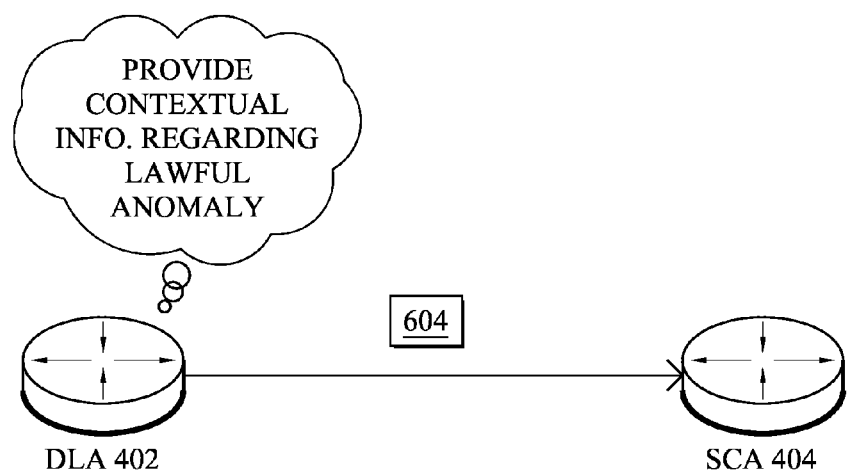

In another embodiment, the detectors in the library of lawful anomalies are always active, but do not suppress events. Instead, the detectors merely "augment" a detected anomaly with contextual information so as to build a summary of what may characterize the specificity of a customer network. For example, as shown in FIG. 6D, DLA 402 may include contextual information in a message 604 sent to SCA 404 regarding a detected anomaly, as generated by its lawful anomaly library of detectors. Using this information, the network administrator may identify the dynamics of the network and validate the "clean" quality of the current traffic.

Once the unsupervised anomaly detection mechanism in the network no longer detects any (unlawful) anomalies, this may signal that the network is clean for purposes of training the unsupervised anomaly detection model. For example, the SCA may instruct the deployed DLA(s) in the network to begin training the unsupervised anomaly detection model by observing the behaviors of the network, once it is determined that the behaviors of the network are acceptable.

Figure 7:
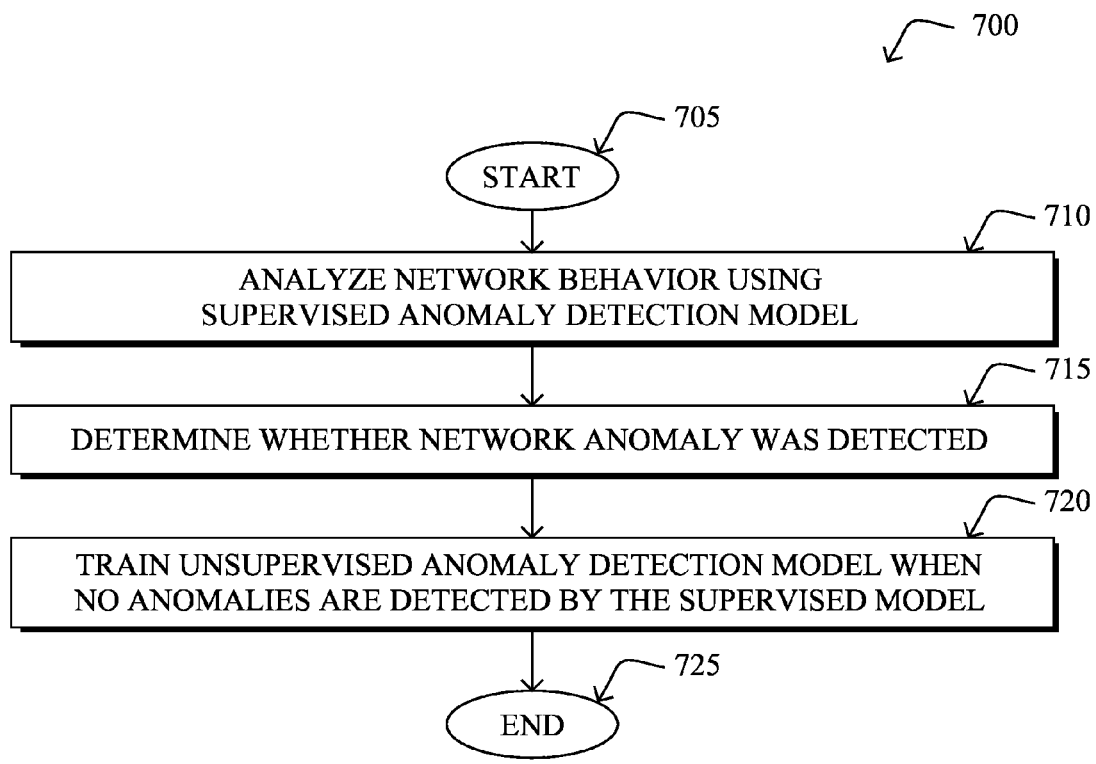
FIG. 7 illustrates an example simplified procedure for preventing compromise of an unsupervised anomaly detection model.

Referring now to FIG. 7, an example simplified procedure 700 for preventing compromise of an unsupervised anomaly detection model is shown, according to various embodiments. Generally, procedure 700 may be performed by any device in a network (e.g., device 200 described above) by executing stored machine instructions. The procedure 700 may begin at step 705 and continue on to step 710 where, as described in greater detail above, the device may analyze network behavior using one or more supervised anomaly detection models. As noted above, such a model may be trained using a set of labels applied to a set of input metrics from one or more other networks than the network in which the device is located. For example, the unsupervised anomaly detection model may be an ANN or other supervised machine learning model that was trained in an offline manner using metrics/behavior data from other networks.

At step 715, as described in greater detail above, the device may determine whether the supervised anomaly detection model detected an anomaly in the network from the analyzed data. In some cases, if the device determines that an anomaly was detected, the device may notify a supervisory device of the detected anomaly, such as an SCA.

In another embodiment, the device may use a library of lawful, but anomalous behaviors (e.g., a set of detectors for specific, lawful network anomalies). If the device determines that the anomaly is otherwise lawful, the device may suppress the alert to the supervisory device. In another embodiment, the library may be used to generate contextual information included in the alert to the supervisory device.

At step 720, the device may train an unsupervised anomaly detection model based on a determination that no anomalies were detected by the supervised anomaly detection model, as described in greater detail above. In particular, if the supervised anomaly detection model indicates that no anomalies are preexisting in the network, the device may begin training the unsupervised anomaly detection model. For example, the device may begin observing network behavior and using the observed network behavior of the network as a non-anomalous baseline for the unsupervised anomaly detection model. Thus, the unsupervised model may detect future anomalies in the network by comparing the expected/baseline network behavior to the current behavior observed in the network. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for unsupervised machine learning models to be deployed in a network, while preventing preexisting, abnormal network behavior from being considered normal. In some cases, the techniques herein may allow for the training of the unsupervised model independent of any prior knowledge of the network. Notably, even if feedback from an administrator is incorporated into the training process, the initial supervised model deployed in the network may be sufficiently generic to begin deployment immediately.

While there have been shown and described illustrative embodiments that provide for a cold-start mechanism to prevent an unsupervised anomaly detection mechanism from being compromised, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
analyzing, by a device in a network, data indicative of a behavior of the network using a supervised anomaly detection model, wherein the supervised anomaly detection model was trained using a set of labels applied to a set of input network metrics from a second network;
determining, by the device, whether the supervised anomaly detection model detected an anomaly in the network from the analyzed data; and
training, by the device, an unsupervised anomaly detection model, based on a determination that no anomalies were detected by the supervised anomaly detection model, wherein training the unsupervised anomaly detection model comprises:
observing, by the device, network behavior, in response to the determination that no anomalies were detected by the supervised anomaly detection model, and
using the observed network behavior of the network as a non-anomalous baseline for the unsupervised anomaly detection model.

2. The method as in claim 1, further comprising:
determining, by the device, that the supervised anomaly detection model has detected an anomaly in the network.

3. The method as in claim 2, further comprising:
suspending, by the device, training of the unsupervised anomaly detection model, in response to determining that the supervised anomaly detection model has detected an anomaly in the network.

4. The method as in claim 2, further comprising:
providing, by the device, an indication of the detected anomaly to a supervisory system in the network, wherein the supervisory system is configured to verify the detected anomaly.

5. The method as in claim 4, wherein the supervisory system verifies the detected anomaly based on input data received from a user interface.

6. The method as in claim 4, further comprising:
receiving, at the device, an update to the supervised anomaly detection model, wherein the update is based on a retraining of the supervised anomaly detection model to account for the detected anomaly.

7. The method as in claim 2, further comprising:
comparing, by the device, the detected anomaly to a library of allowed anomalies.

8. The method as in claim 7, further comprising:
suppressing, by the device, generation of an alert, based on a determination that the detected anomaly is in the library of allowed anomalies.

9. The method as in claim 7, further comprising:
providing, by the device, an indication of the detected anomaly with contextual information to a supervisory system in the network, based on a determination that the detected anomaly is in the library of allowed anomalies.

10. An apparatus, comprising:
one or more network interfaces to communicate with a network;
a processor coupled to the network interfaces and adapted to execute one or more processes; and
a memory configured to store a process executable by the processor, the process when executed configured to:

analyze data indicative of a behavior of the network using a supervised anomaly detection model, wherein the supervised anomaly detection model was trained using a set of labels applied to a set of input network metrics from a second network;

determine whether the supervised anomaly detection model detected an anomaly in the network from the analyzed data; and train an unsupervised anomaly detection model, based on a determination that no anomalies were detected by the supervised anomaly detection model, wherein training the unsupervised anomaly detection model comprises:

observing, by the device, network behavior, in response to the determination that no anomalies were detected by the supervised anomaly detection model, and using the observed network behavior of the network as a non-anomalous baseline for the unsupervised anomaly detection model.

11. The apparatus as in claim 10, wherein the process when executed is further configured to determine that the supervised anomaly detection model has detected an anomaly in the network.

12. The apparatus as in claim 11, wherein the process when executed is further configured to provide an indication of the detected anomaly to a supervisory system in the network, wherein the supervisory system is configured to verify the detected anomaly.

13. The apparatus as in claim 12, wherein the process when executed is further configured to suspend training of the unsupervised anomaly detection model, in response to receiving an instruction from the supervisory system, after providing the indication of the detected anomaly to the supervisory system.

14. The apparatus as in claim 12, wherein the process when executed is further configured to receive an update to the supervised anomaly detection model, wherein the update is based on a retraining of the supervised anomaly detection model to account for the detected anomaly.

15. The apparatus as in claim 11, wherein the process when executed is further configured to compare the detected anomaly to a library of allowed anomalies.

16. The apparatus as in claim 15, wherein the process when executed is further configured to suppress generation of an alert, based on a determination that the detected anomaly is in the library of allowed anomalies.

17. The apparatus as in claim 15, wherein the process when executed is further configured to provide an indication of the detected anomaly with contextual information to a supervisory system in the network, based on a determination that the detected anomaly is in the library of allowed anomalies.

18. A tangible, non-transitory, computer-readable media having software encoded thereon, the software when executed by a processor configured to:

analyze data indicative of a behavior of a network using a supervised anomaly detection model, wherein the supervised anomaly detection model was trained using a set of labels applied to a set of input network metrics from a second network;

determine whether the supervised anomaly detection model detected an anomaly in the network from the analyzed data; and train an unsupervised anomaly detection model, based on a determination that no anomalies were detected by the supervised anomaly detection model, wherein training the unsupervised anomaly detection model comprises:

observing, by the device, network behavior, in response to the determination that no anomalies were detected by the supervised anomaly detection model, and using the observed network behavior of the network as a non-anomalous baseline for the unsupervised anomaly detection model.

\* \* \* \* \*

UNITED STATES PATENT AND TRADEMARK OFFICE
CERTIFICATE OF CORRECTION

PATENT NO. : 9,838,409 B2
APPLICATION NO. : 14/878145
DATED : December 5, 2017
INVENTOR(S) : Fabien Flacher et al.

It is certified that error appears in the above-identified patent and that said Letters Patent is hereby corrected as shown below:

In the Specification

In Column 1, Line 26, please amend as shown:
cious requests, making it more difficult to distinguish In Column 2, Line 33, please amend as shown:
consists of a set of rules defining how the nodes interact In Column 4, Line 62, please amend as shown:
months (e.g., season changes of an outdoor environ- In Column 5, Line 37, please amend as shown:
Cisco Systems, Inc., another operating system, etc.)

In Column 6, Line 11, please amend as shown:
IETF Internet Draft entitled "BGP MPLS Based Ethernet In Column 8, Line 39, please amend as shown:
entities as a graph of nodes interconnected by edges. For In Column 9, Line 13, please amend as shown:
(usually threshold-based) techniques useless for detecting In Column 9, Line 54, please amend as shown:
applications), communication applications, and the like.

In Column 10, Line 31, please amend as shown:
attempt to extract regular behavior patterns from this data, Signed and Sealed this
Twelfth Day of January, 2021

Andrei Iancu
*Director of the United States Patent and Trademark Office*

CERTIFICATE OF CORRECTION (continued)
U.S. Pat. No. 9,838,409 B2

In Column 11, Line 4, please amend as shown:
machine learning, prior to, or in conjunction with, the In Column 11, Line 46, please amend as shown:
on the use of one or more supervised learning machines